Oct. 14, 1941.    J. L. SIESENNOP    2,258,627
ACCELERATOR AND BRAKE CONTROL
Filed April 13, 1940    3 Sheets-Sheet 1

Inventor
J.L.Siesennop
By
Attorneys

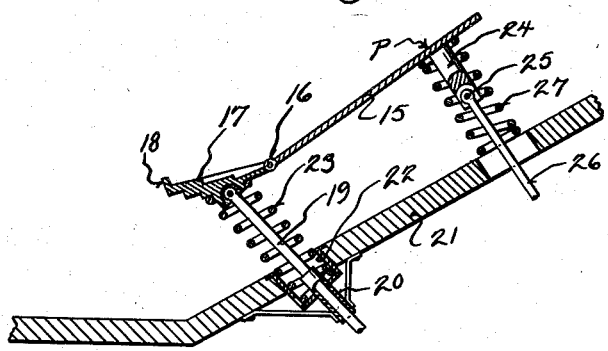
Fig. 2.
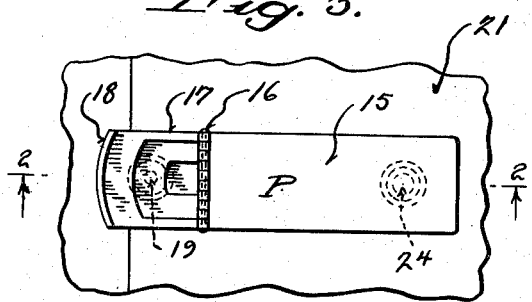
Fig. 3.
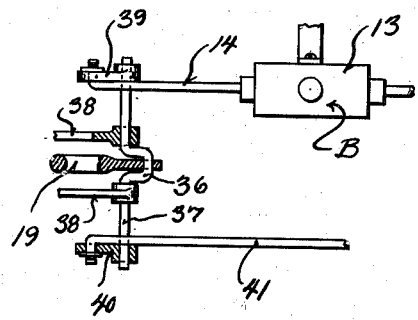
Fig. 6.
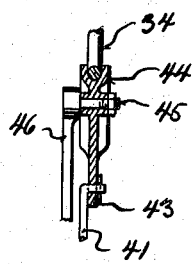
Fig. 5.

Oct. 14, 1941.  J. L. SIESENNOP  2,258,627
ACCELERATOR AND BRAKE CONTROL
Filed April 13, 1940   3 Sheets-Sheet 3
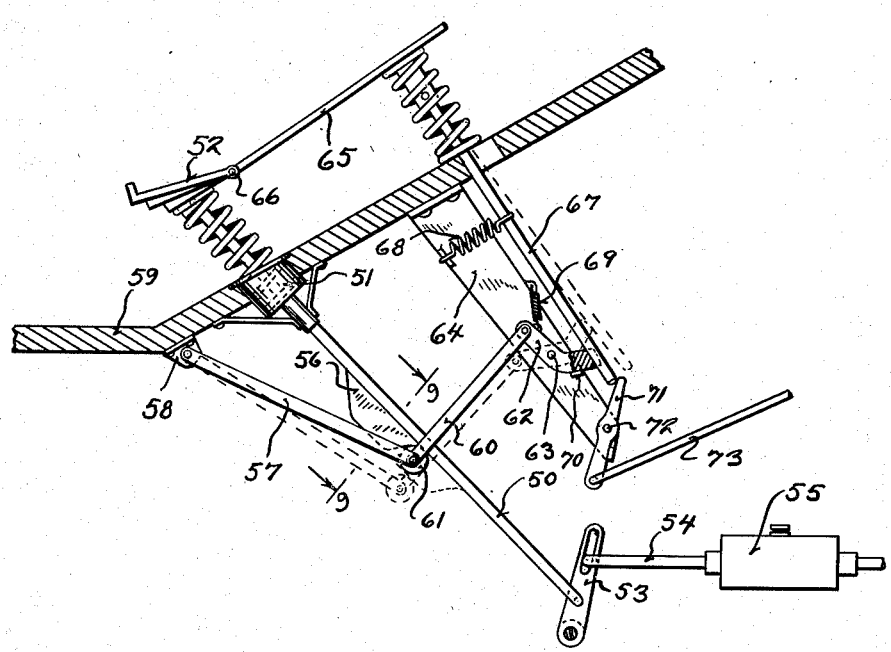
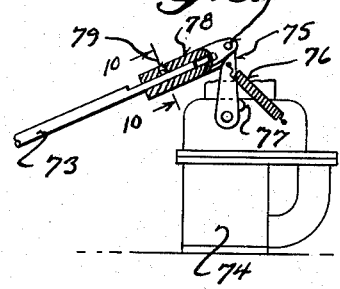
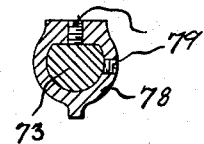
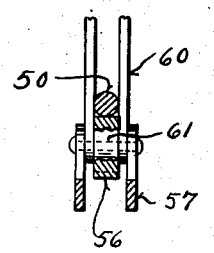
Inventor
J. L. Siesennop
Attorneys Patented Oct. 14, 1941

2,258,627

UNITED STATES PATENT OFFICE 2,258,627

ACCELERATOR AND BRAKE CONTROL

John L. Siesennop, Merrill, Wis.

Application April 13, 1940, Serial No. 329,448

4 Claims. (Cl. 192—3)

This invention appertains to motor vehicles, and more particularly to a novel pedal mechanism for operating the brakes and throttle of an automobile.

One of the primary objects of my invention is to provide a single foot pedal for actuating both the engine throttle or carburetor control and the brakes, whereby to simplify the operation of an automobile and permit the quick and effective applying of the brakes.

Another salient object of my invention is to provide a single foot pedal mechanism for automobiles in which the throttle can be controlled by pressure of the toe, and in which the brakes can be controlled by downward pressure of the heel.

A further important object of my invention is to provide means for rendering the throttle operating mechanism inoperative upon the actuation of the brakes, whereby accidents caused by the inadvertent racing of the engine is eliminated, and whereby to prevent undue wear on the brake linings caused generally by using the brakes to slow up the speed of a vehicle while the engine is still being accelerated.

A still further object of my invention is to provide a novel automobile control of the above character, which will be durable and efficient in use, one that will be simple and easy to manufacture, and one which can be placed upon the market and incorporated with an automobile at a low cost.

With these and other objects in view, the invention consists in the novel construction, arrangement, and formation of parts, as will be hereinafter more specifically described, claimed, and illustrated in the accompanying drawings, in which drawings:

Figure 2 is an enlarged, detail, fragmentary, sectional view taken on line 2—2 of Figure 3 showing my novel single pedal mechanism for operating the brakes and engine accelerator.

Figure 3 is a top plan view illustrating the novel single pedal control.

Figure 4 is a detail, enlarged, fragmentary, vertical section illustrating the actuating means for the butterfly valve of the carburetor, and the means for rendering said actuating means inoperative.

Figure 5 is a detail, fragmentary, transverse, sectional view taken on the line 5—5 of Figure 4, looking in the direction of the arrows.

Figure 6 is a detail, fragmentary, horizontal, sectional view taken substantially on the line 6—6 of Figure 1, looking in the direction of the arrows.

Figure 7 is an enlarged, fragmentary, detail, sectional view showing a modified form of my novel pedal mechanism.

Figure 8 is an enlarged, fragmentary, detail, vertical, sectional view illustrating the means of operatively connecting the operating link of the pedal attachment with the butterfly valve of the carburetor.

Figure 9 is a fragmentary, detail, sectional view taken on the line 9—9 of Figure 7, looking in the direction of the arrows, illustrating the operating and supporting means for the brake push rod and the carburetor kick-off.

Figure 10 is an enlarged, fragmentary, detail, sectional view taken on the line 10—10 of Figure 8, looking in the direction of the arrows, illustrating the means for adjustably connecting the operating link to the butterfly valve of the carburetor.

Figure 1:
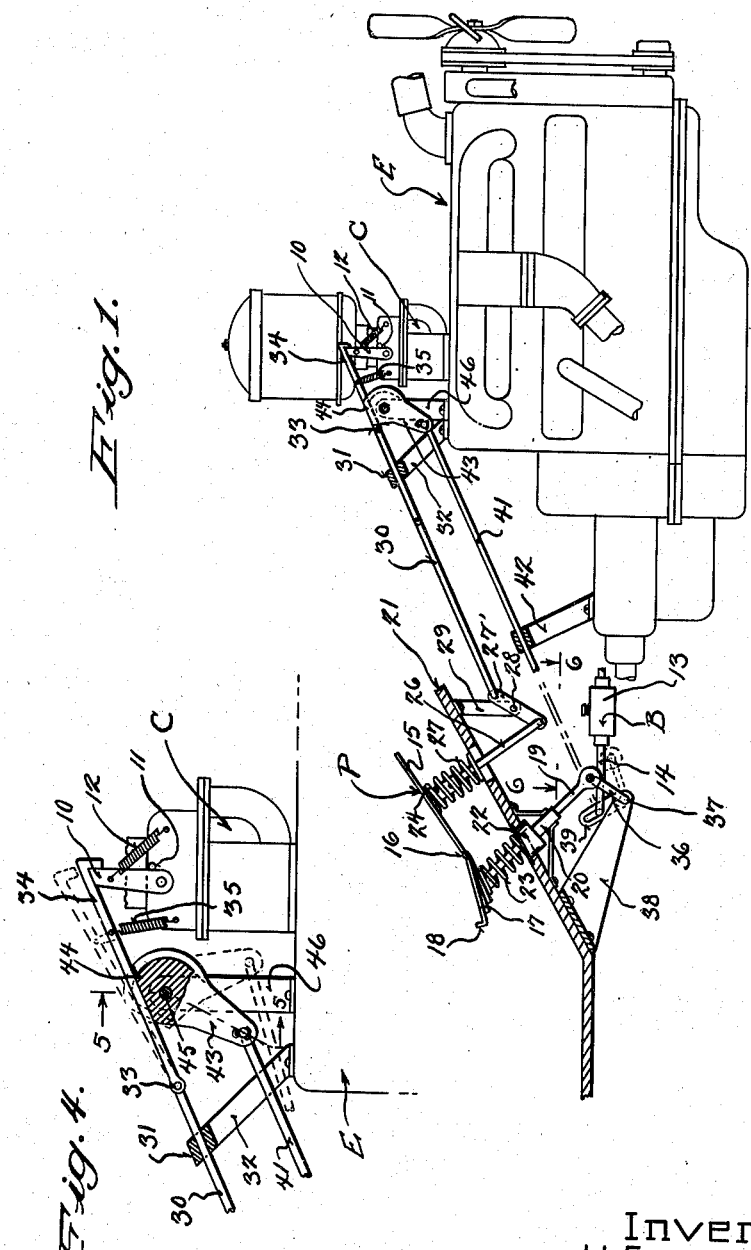
Figure 1 is a fragmentary, longitudinal section through an automobile, illustrating my novel mechanism for controlling the throttle and brakes of the automobile.

Referring to the drawings in detail, wherein similar reference characters designate corresponding parts throughout the several views, the letter P generally indicates my novel pedal mechanism for bringing about the control of a carburetor C for an engine E and the brake mechanism B for an automobile.

My device can be incorporated with various makes, types, and sizes of automobiles, and it is to be understood that slight changes in details will have to be resorted to to accommodate my device to different makes of engines, brakes, etc.

The engine E is of the usual internal combustion type, and the carburetor C therefor is shown to be of the downdraft character and includes a crank lever 10 for the butterfly throttle valve of the engine. The crank 10 is normally held in an idling position against a stop 11 by a contractile coil spring 12. Thus, during the speeding up of the engine, the crank 11 is moved away from the stop 12 against the tension of the spring.

The brake mechanism B can be of the hydraulic type, and for the purpose of illustrating my invention, I have merely shown the master cylinder for the hydraulic brake mechanism. Leading from the master cylinder 13 is the piston rod 14 for compressing the fluid in the master cylinder and for forcing such fluid to the individual wheel brake-applying structure.

My novel pedal mechanism P includes an elongated toe plate 15 hingedly secured, as at 16, to a heel plate 17. The heel plate 17 can have depressions therein of different sizes to accommodate the heels of women's shoes, and the rear edge of the heel plate can be provided with a guard flange 18, so as to prevent the sliding off of a man's heel from the plate.

Pivotally secured to the heel plate 17 is an angularly extending push rod 19, and this push rod extends through a guide sleeve 20 rigidly secured to the floorboards 21 of the automobile. The guide sleeve 20 can also be secured to a cup 22, which is rigidly fastened to the floorboards, and this cup receives the lower end of an expansion spring 23, which is coiled about the push rod 20. As illustrated, the spring 23 is confined between the cup and the heel plate 17. The cup can have drain openings therein to permit the escape of moisture and dirt therefrom.

The toe plate 15 adjacent its forward end has rigidly secured thereto a depending stud 24, and this stud, in turn, has pivotally connected thereto, as at 25, an operating link 26, and this link extends through a slot in the floorboards. The toe plate 15 is normally held in a raised position by an expansion coil spring 27, which is placed about the link 26 and the stud 24 and confined between the floorboards and the toe plate.

As shown in Figure 1, the lower end of the link 26 is pivotally connected to a double-armed lever 27', and this lever is rockably mounted intermediate its ends on a pivot pin 28 carried by a depending bracket 29 fastened to the floorboards 21. Pivotally connected to the lever 27 on the opposite side of its pivot from the link 26 is an operating slide rod 30. This rod is guided in its movement in a bearing 31 carried by a bracket 32, which may be bolted or otherwise fastened to the block of the engine. The extreme forward end of the operating rod 30 has pivotally connected thereto, as at 33, a hook 34, which engages over the crank 10 of the carburetor. A light coil spring 35 can be employed for normally holding the hook 34 down in engagement with the crank.

From the construction so far, it can be seen that upon downward movement of the toe or sole plate 15 of the pedal P, the double-armed lever 27 will be rocked in a counterclockwise direction, which will draw back on the rod 30, causing a pull on the crank 10. This will actuate the butterfly valve of the carburetor and bring about speeding up of the engine.

Referring back to the push rod 19 of the heel plate 17, it will be noted that the lower end thereof is rockably mounted upon the throw arm 36 of a crank shaft 37, which is rotatably supported in suitable brackets 38 carried by the floorboards of the automobile. The crank shaft 37 has secured thereto or formed thereon a crank arm 39, and this crank arm, in turn, has operatively connected thereto the piston rod 14 of the master cylinder 13 constituting a part of the brake mechanism B. Hence, upon downward pressure on the heel plate 17, the throw arm 36 of the crank shaft will be rotated in a clockwise direction, and forward movement of the crank arm 39 will bring about movement of the piston rod 14 into the master cylinder and the application of the brakes.

In order to insure against the inadvertent acceleration of the engine E during the application of the brakes, the crank shaft 37 also has formed thereon or secured thereto a second crank arm 40, and this crank arm 40 has operatively connected thereto a forwardly extending operating rod 41. The rod 41 is guided in its movement by a bracket 42, which can be secured to an adjacent stationary part of the automobile. The forward end of the rod 41 is pivotally secured to an arm 43 formed on a cam 44. This is clearly shown in Figures 1, 4, and 5 of the drawings.

The cam 44 is rotatably mounted on a stub shaft 45 carried by a bracket 46 secured to an adjacent stationary part of the automobile, such as the engine block. The cam 44 can be grooved for receiving the pivoted hook 34 of the throttle-operating mechanism, and upon the rotation of the cam 44 in a counterclockwise direction by forward push of the rod 41, the hook 34 will be raised against the tension of its spring 35 out of engagement with the throttle crank 10, and, hence, the spring 12 of the crank will hold the crank in its idling position.

By this construction, upon movement of the heel plate 17 in a downward direction, the crank shaft 37 will be operated for applying the brakes, and simultaneous with this movement, the rod 41 will be pushed forwardly, which will rotate the cam 44 and raise the hook 34, as just described.

In Figures 7 to 10, inclusive, I have shown a modified form of my invention, and in this form the brake push rod 50 extends directly down through the floorboard guide means 51 from the heel plate 52 to the operating crank 53. The operating crank 53 is, in turn, operatively connected to the piston rod 54 of the master cylinder 55 for the brakes.

Rigidly fastened to the push rod 50 is an actuating cam 56, and disposed in the path of the cam is a swinging lever 57. This lever is rockably connected at its upper end to a bracket 58, which can be secured to the floorboards 59 of an automobile. The lever 57 can be in the nature of spaced plates, and these plates receive between the same the forwardly extending links 58, 59, and 60 and the antifriction roller 61. The links 60 extend to and are pivotally connected with the upper end of a bell crank-shaped lever 62. This bell crank lever 62 is rockably mounted substantially at its angle on a pivot pin 63 carried by a depending bracket 64. The toe plate 65, which is rockably connected, as at 66, to the heel plate, has pivotally connected therewith the depending push rod 67 for the throttle. This push rod is normally urged toward the bell crank lever 62 by a contractile coil spring 68. The bell crank lever, in turn, is normally urged away from the accelerator push rod 67 by a light coil spring 69, and this coil spring, in turn, normally holds the anti-friction roller 61 in engagement with the brake push rod 50 and in the path of the cam 56. Swinging movement of the bell crank-shaped lever 62 in one direction is limited by a stop 70.

The lower end of the throttle push rod 67 normally engages the upper end of one arm of the double-armed lever 71. This lever 71 is rockably mounted intermediate its ends on a pivot pin 72 carried by the bracket 64. The lower end of the double-armed lever 71 has pivotally connected thereto the operating link 73, which extends toward the engine carburetor 74. The butterfly valve of the engine carburetor has rigidly connected thereto the operating crank 75, and the valve is normally held in a closed position by a tension spring 76, which is connected with the crank 75 and the carburetor. The spring holds the crank against a stop lug 77. Adjustably connected to the flattened end of the link 73 is a coupling sleeve 78, and, obviously, the coupling sleeve can be slid along the link 73 to the desired position, and can be held in an adjusted position by set screws 79. The forward end of the sleeve can be pivotally connected with the crank by means of a pivot pin 80.

In operation of this form of my invention, when downward pressure is exerted on the toe place 65, the accelerator push rod 67 will be forced downwardly against the double-armed lever 71. This will pull back on the link 73 and open up the butterfly valve of the carburetor. When downward pressure is exerted on the heel plate 72, the brake push rod 60 will be forced downward, which will operate the brakes.

Synchronous with the operation of the brakes, the cam 56 will engage the roller 61 and swing back on the lever 67. This will pull back on the links 60 and operate the bell crank 62 for swinging the push rod 67 away from the double-armed lever 71. Thus, operation of the carburetor will be prevented.

From the foregoing description it can be seen that I have provided an exceptionally simple and durable means for controlling the brake mechanism and throttle mechanism of an automobile from a single foot pedal structure.

Changes in details may be made without departing from the spirit or the scope of my invention, but what I claim as new is:

1. The combination with the brake mechanism of an automobile and an engine having a carburetor including, a throttle valve and an operating crank therefor, of a foot pedal including pivotally connected toe and heel plates movable independently of one another, depending operating rods connected to the plates for independent movement, a two-armed lever rockably mounted intermediate its ends, means operatively connecting one arm to one rod, an operating link pivotally connected to the other arm, a pivoted hook on said link for detachably engaging the crank arm of the throttle valve, a crank shaft, means for operating the crank shaft from the other pedal rod, means for operating the brake mechanism from the crank shaft, and means for raising the hook out of operative engagement with the crank of the throttle valve from said crank shaft upon actuation thereof.

2. The combination with the brake mechanism of an automobile and an engine having a carburetor including, a throttle valve and an operating crank therefor, of a foot pedal including pivotally connected toe and heel plates movable independently of one another, depending operating rods connected to the plates for independent movement, a two-armed lever rockably mounted intermediate its ends, means operatively connecting one arm to one rod, an operating link pivotally connected to the other arm, a pivoted hook on said link for detachably engaging the crank arm of the throttle valve, a crank shaft, means for operating the crank shaft from the other pedal rod, means for operating the brake mechanism from the crank shaft, and means for raising the hook out of operative engagement with the crank of the throttle valve from said crank shaft upon actuation thereof, said means including a pivoted cam having its low point normally supporting the hook, and a link operatively connecting the cam with the crank shaft.

3. The combination with an automobile including brake mechanism, an engine having a carburetor, and a throttle valve with a swinging crank for operating the same, a hingedly connected heel and toe plate, means for actuating the brake mechanism from the heel plate, and means for operating the swinging crank for the throttle valve from the toe plate including, a swinging push rod connected with the toe plate, a double-armed crank having one end normally disposed in the path of the swinging push rod, means operatively connecting the other end of the double crank to the crank of the carburetor, and means for moving the swinging push rod out of engagement with the double crank upon actuation of the heel plate and the brake mechanism.

4. The combination with an automobile including brake mechanism, an engine having a carburetor and a throttle valve with a swinging crank for operating the same, a pivotally connected heel plate and toe plate, means including a push rod for operating the brake mechanism from the heel plate, means for operating the throttle valve from the toe plate including, a pivotally connected, depending operating rod, a double-armed crank rockably mounted intermediate its ends having one end disposed below the pivoted operating rod, means operatively connecting the other end of the double crank to the crank of the throttle valve, a bell crank lever rockably supported intermediate its ends engaging the swinging operating rod adjacent the double-armed crank, a swinging supporting lever, links pivotally connecting the swinging supporting lever with the bell crank lever, and a cam on the push rod for actuating the swinging supporting lever upon downward movement of the push rod to raise the swinging operating rod out of engagement with the double-armed crank by the bell crank.

JOHN L. SIESENNOP.